United States Patent
Wong et al.

(10) Patent No.: US 12,530,098 B2
(45) Date of Patent: Jan. 20, 2026

(54) TOUCH PANEL AND OPERATING METHOD FOR TOUCH PANEL

(71) Applicant: ILI TECHNOLOGY CORP., Hsinchu County (TW)

(72) Inventors: Wen-Ger Wong, Hsinchu County (TW); Yung-Fu Lin, Hsinchu County (TW); Jung-Kuei Hsu, Hsinchu County (TW); Chuan-Chi Fan, Hsinchu County (TW); Chia-Chun Hsu, Hsinchu County (TW); Cheng-Chung Hsu, Hsinchu County (TW)

(73) Assignee: ILI TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 19/000,741

(22) Filed: Dec. 24, 2024

(65) Prior Publication Data
US 2025/0298482 A1    Sep. 25, 2025

(30) Foreign Application Priority Data
Mar. 25, 2024   (TW) .................................. 113110921

(51) Int. Cl.
  *G06F 3/041*    (2006.01)
  *G06F 3/044*    (2006.01)

(52) U.S. Cl.
  CPC ...... *G06F 3/04166* (2019.05); *G06F 3/04182* (2019.05); *G06F 3/044* (2013.01)

(58) Field of Classification Search
  CPC ... G06F 3/04166; G06F 3/04182; G06F 3/044
  See application file for complete search history.

(56) References Cited

U.S. PATENT DOCUMENTS

| | | | |
|---|---|---|---|
| 2008/0158167 A1 | 7/2008 | Hotelling et al. | |
| 2009/0189867 A1* | 7/2009 | Krah .................... | G06F 3/0446 345/173 |

(Continued)

FOREIGN PATENT DOCUMENTS

| | | |
|---|---|---|
| CN | 103984432 | 8/2014 |
| CN | 105446547 | 3/2016 |

(Continued)

OTHER PUBLICATIONS

"Office Action of Taiwan Counterpart Application", issued on Mar. 25, 2025, p. 1-p. 4.

*Primary Examiner* — Hong Zhou
(74) *Attorney, Agent, or Firm* — JCIPRNET

(57) ABSTRACT

A touch panel and an operating method for the touch panel are provided. The touch panel includes touch areas and a sensing circuit. In a power saving mode, adjacent touch areas among the touch areas receive touch drive signals with different frequencies. At least two non-adjacent touch areas have the same frequency and different phases. The touch panel sends touch drive signals to the touch areas simultaneously within a time interval. The sensing circuit receives touch sensing signals from the touch areas in the power saving mode, and determines whether the touch panel is touched according to at least one of the touch sensing signals. The touch panel is controlled to enter a normal mode in response to the touch panel being touched.

11 Claims, 7 Drawing Sheets

(56) References Cited

U.S. PATENT DOCUMENTS

| | | | | |
|---|---|---|---|---|
| 2013/0314366 A1* | 11/2013 | Mo | ................. | G06F 3/0446 |
| | | | | 345/174 |
| 2014/0198053 A1* | 7/2014 | Yoon | ................. | G06F 3/047 |
| | | | | 345/173 |
| 2015/0002444 A1* | 1/2015 | Brunet | ................. | G06F 3/0446 |
| | | | | 345/174 |
| 2015/0109212 A1* | 4/2015 | Yao | ................. | G06F 3/0446 |
| | | | | 345/173 |
| 2021/0397323 A1 | 12/2021 | Ye | | |

FOREIGN PATENT DOCUMENTS

| | | |
|---|---|---|
| CN | 111475058 | 7/2020 |
| CN | 114594869 | 6/2022 |
| CN | 117631869 | 3/2024 |
| TW | 202223614 | 6/2022 |

\* cited by examiner

US 12,530,098 B2

TOUCH PANEL AND OPERATING METHOD FOR TOUCH PANEL

CROSS-REFERENCE TO RELATED APPLICATION

This application claims the priority benefit of Taiwan application serial no. 113110921, filed on Mar. 25, 2024. The entirety of the above-mentioned patent application is hereby incorporated by reference herein and made a part of this specification.

BACKGROUND

Technical Field

The disclosure relates to a panel and an operating method for the panel, and particularly relates to a touch panel and an operating method for the touch panel.

Related Art

A touch panel includes multiple touch electrodes. Generally, the touch panel determines whether the touch panel is touched in a power saving mode. When the touch panel is touched in the power saving mode, the touch panel enters a normal mode to perform a corresponding operation based on the user's touch.

It should be noted that the existing touch panel scans the touch electrodes row by row in the power saving mode. Therefore, the touch determination in the power saving mode may take a longer time for calculation. Besides, the aforementioned row-by-row scanning still consumes more power. In other words, in the power saving mode, the power saving performance of the touch panel is limited.

SUMMARY

The disclosure provides a touch panel and an operating method for the touch panel, which are capable of shortening the calculation time for touch determination in the power saving mode and reducing the power consumption of the touch panel.

The touch panel according to an embodiment of the disclosure includes multiple touch areas and a sensing circuit. Adjacent touch areas among the multiple touch areas receive multiple touch drive signals with different frequencies. At least two non-adjacent touch areas have the same frequency and different phases. In a power saving mode, the touch panel simultaneously sends the multiple touch drive signals to the multiple touch areas within a time interval. The sensing circuit is coupled to the multiple touch areas. In the power saving mode, the sensing circuit receives multiple touch sensing signals from the multiple touch areas, determines whether the touch panel is touched according to at least one of the multiple touch sensing signals, and controls the touch panel to enter a normal mode in response to the touch panel being touched.

The operating method according to an embodiment of the disclosure is adapted for a touch panel. The operating method includes the following. In a power saving mode, the touch panel simultaneously sends multiple touch drive signals to multiple touch areas within a time interval. Adjacent touch areas among the multiple touch areas receive the multiple touch drive signals with different frequencies, and at least two non-adjacent touch areas have the same frequency and different phases. Multiple touch sensing signals are received from the multiple touch areas in the power saving mode. Whether the touch panel is touched is determined according to at least one of the multiple touch sensing signals. In response to the touch panel being touched, the touch panel is controlled to enter a normal mode.

Based on the above, the touch panel simultaneously sends multiple touch drive signals to multiple touch areas within a time interval in the power saving mode. Thus, the calculation time for touch determination in the power saving mode of the touch panel can be shortened. Moreover, non-adjacent touch areas have the same frequency and different phases. In the case where multiple touch drive signals are simultaneously provided to the corresponding touch areas, the touch sensing signals of adjacent touch areas do not interfere with each other.

DESCRIPTION OF THE EMBODIMENTS

Figure 1:
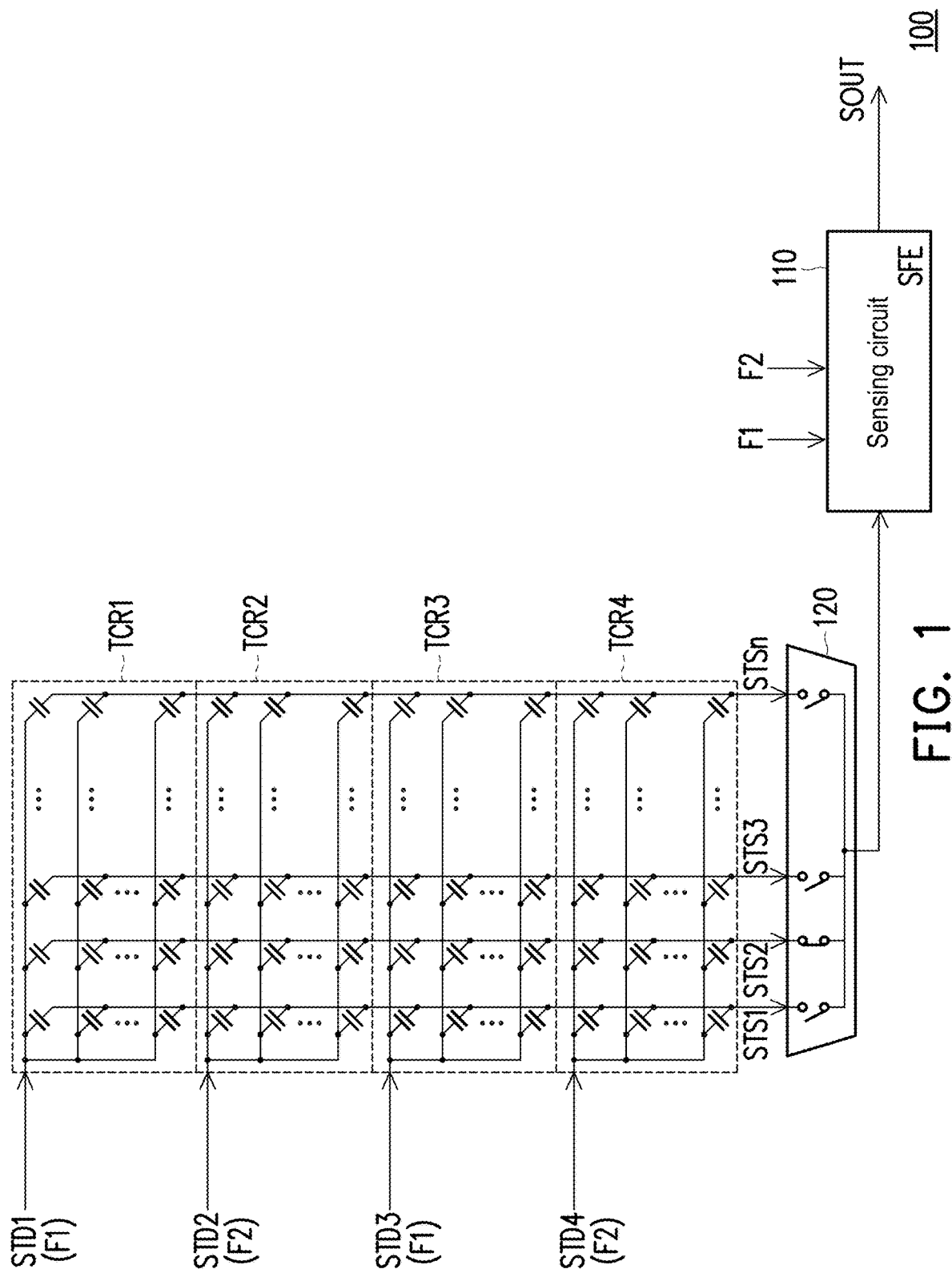
FIG. 1 is a schematic diagram illustrating the touch panel according to an embodiment of the disclosure.

Some embodiments of the disclosure will be described in detail hereinafter with reference to the accompanying drawings. Regarding the reference numerals used in the following description, identical reference numerals shown in different drawings will be regarded as identical or similar components. Nevertheless, these embodiments are only a part of the disclosure, and do not disclose all possible implementations of the disclosure. More precisely, these embodiments are only examples within the scope of the claims.

Referring to FIG. 1, FIG. 1 is a schematic diagram illustrating the touch panel according to an embodiment of the disclosure. In this embodiment, a touch panel 100 may be a touch panel with a self-capacitance sensing function and/or a mutual-capacitance sensing function. The touch panel 100 includes touch areas TCR1 to TCR4 and a sensing circuit 110. In a power saving mode, the touch panel 100 simultaneously sends multiple touch drive signals to the touch areas TCR1 to TCR4 within a time interval. Therefore, within the same time interval in the power saving mode, the touch area TCR1 receives a touch drive signal STD1 in the power saving mode. The touch area TCR2 receives a touch drive signal STD2 in the power saving mode. The touch area TCR3 receives a touch drive signal STD3 in the power saving mode. The touch area TCR4 receives a touch drive signal STD4 in the power saving mode.

In this embodiment, at least two non-adjacent touch areas have the same frequency and different phases. For example, the touch area TCR1 and the touch area TCR3 are separated by the touch area TCR2. In other words, the touch area TCR2 is located between the touch area TCR1 and the touch area TCR3. The touch area TCR1 is not adjacent to the touch area TCR3. The touch area TCR2 and the touch area TCR4 are separated by the touch area TCR3. In other words, the touch area TCR3 is located between the touch area TCR2 and the touch area TCR4. The touch area TCR2 is not adjacent to the touch area TCR4. The touch drive signal STD1 and the touch drive signal STD3 have the same first frequency F1. The touch drive signal STD1 and the touch drive signal STD3 have different phases. The touch drive signal STD2 and the touch drive signal STD4 have the same second frequency F2. The second frequency F2 is different from the first frequency F1. The touch drive signal STD2 and the touch drive signal STD4 have different phases.

In this embodiment, the sensing circuit 110 is coupled to the touch areas TCR1 to TCR4. In the power saving mode, the sensing circuit 110 receives touch sensing signals STS1 to STSn from the touch areas TCR1 to TCR4. In the power saving mode, the sensing circuit 110 determines whether the touch panel 100 is touched according to at least one of the touch sensing signals STS1 to STSn. In response to the touch panel 100 being touched, the sensing circuit 110 controls the touch panel 100 to enter a normal mode.

It is worth mentioning that the touch panel 100 simultaneously sends the touch drive signals STD1 to STD4 to the touch areas TCR1 to TCR4 within a time interval in the power saving mode. Thus, the calculation time for touch determination of the touch panel 100 in the power saving mode can be shortened. Furthermore, non-adjacent touch areas have the same frequency and different phases. Thus, in the case where the touch drive signals STD1 to STD4 are provided to the corresponding touch areas simultaneously, the touch sensing signals of adjacent touch areas do not interfere with each other.

In this embodiment, the sensing circuit 110 converts at least one of the touch sensing signals STS1 to STSn into a front-end signal SFE in the power saving mode. The sensing circuit 110 may generate an output signal SOUT by performing a demodulation operation on the front-end signal SFE based on the first frequency F1 and the second frequency F2. In this embodiment, the touch area TCR1 and the touch area TCR3 are a first touch area group corresponding to the first frequency F1. The touch area TCR2 and the touch area TCR4 are a second touch area group corresponding to the second frequency F2. The output signal SOUT is correlated to the capacitance value result of the first touch area group and the capacitance value result of the second touch area group. Therefore, the sensing circuit 110 can determine whether the touch panel 100 is touched according to the capacitance value difference of the first touch area group and/or the capacitance value difference of the second touch area group.

Taking adjacent touch areas TCR1 and TCR2 as an example, generally, the current touch drive signals STD1 and STD2 have the same frequency. It should be noted that in the case where the touch drive signal STD1 and the touch drive signal STD2 are provided simultaneously in the power saving mode, when adjacent two of the touch area TCR1 and the touch area TCR2 are touched simultaneously, the capacitance values of the touch area TCR1 and the touch area TCR2 change in the same way. Therefore, in the case where the touch drive signal STD1 and the touch drive signal STD2 are provided simultaneously in the power saving mode, when adjacent two of the touch area TCR1 and the touch area TCR2 are touched simultaneously, the capacitance value difference between the touch area TCR1 and the touch area TCR2 does not change. The output signal SOUT cannot indicate that the touch panel 100 is touched. In this embodiment, among adjacent touch areas TCR1 and TCR2, the second frequency F2 is different from the first frequency F1. When adjacent two of the touch areas TCR1 to TCR4 are touched simultaneously, the output signal SOUT can still indicate that the touch panel 100 is touched. For example, when the user's finger touches the boundary between the touch area TCR1 and the touch area TCR2, based on the demodulation operation, the output signal SOUT can indicate that both the touch area corresponding to the first frequency F1 and the touch area corresponding to the second frequency F2 are touched.

In this embodiment, the touch panel 100 further includes a selection circuit 120. Multiple input terminals of the selection circuit 120 respectively receive one of the touch sensing signals STS1 to STSn. An output terminal of the selection circuit 120 is coupled to the sensing circuit 110. The selection circuit 120 provides the touch sensing signals STS1 to STSn to the sensing circuit 110 sequentially in a time-division manner. In some embodiments, the selection circuit 120 provides the touch sensing signals STS1 to STSn to the sensing circuit 110 simultaneously.

In this embodiment, the touch areas TCR1 to TCR4 have substantially the same area. However, the disclosure is not limited thereto.

In this embodiment, in the normal mode, the sensing circuit 110 determines whether the touch panel 100 is touched according to at least one of the touch sensing signals STS1 to STSn. In the normal mode, when the touch panel 100 is not touched, the sensing circuit 110 restarts timing. When the touch panel 100 is not touched in a set time duration, the sensing circuit 110 controls the touch panel 100 to return from the normal mode to the power saving mode. In this embodiment, the set time duration is settable.

Figure 2A:
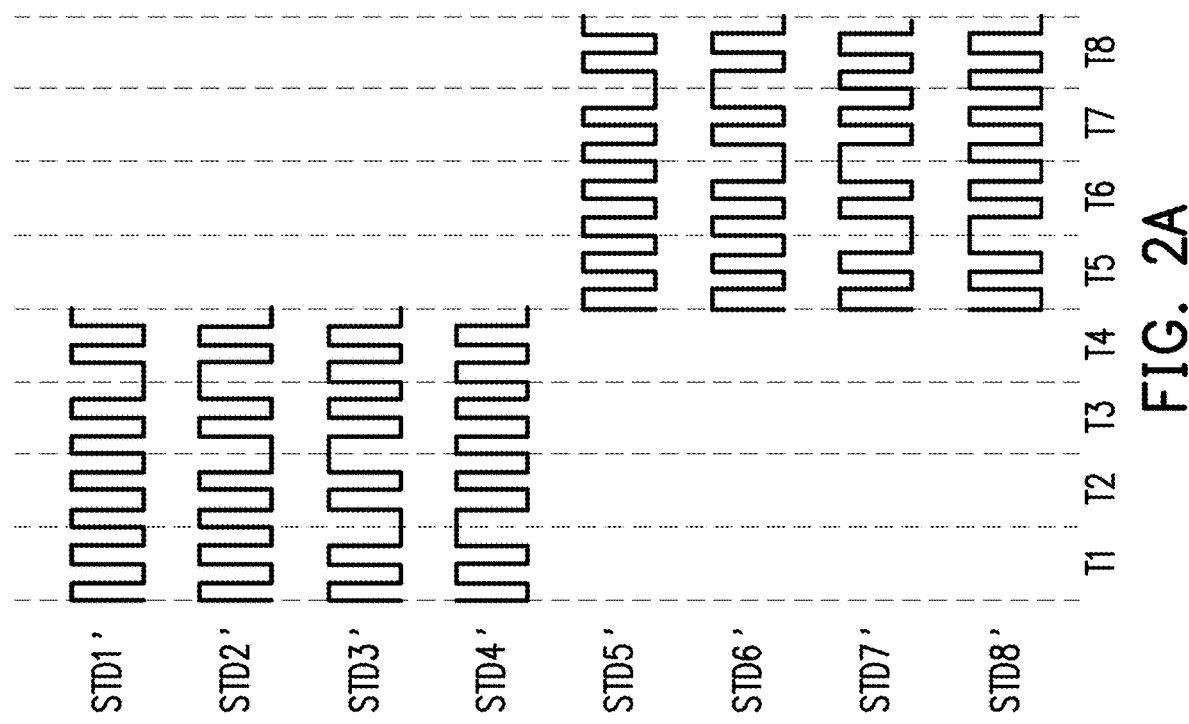
FIG. 2A is a waveform diagram illustrating the touch drive signals for comparison.
Figure 2B:
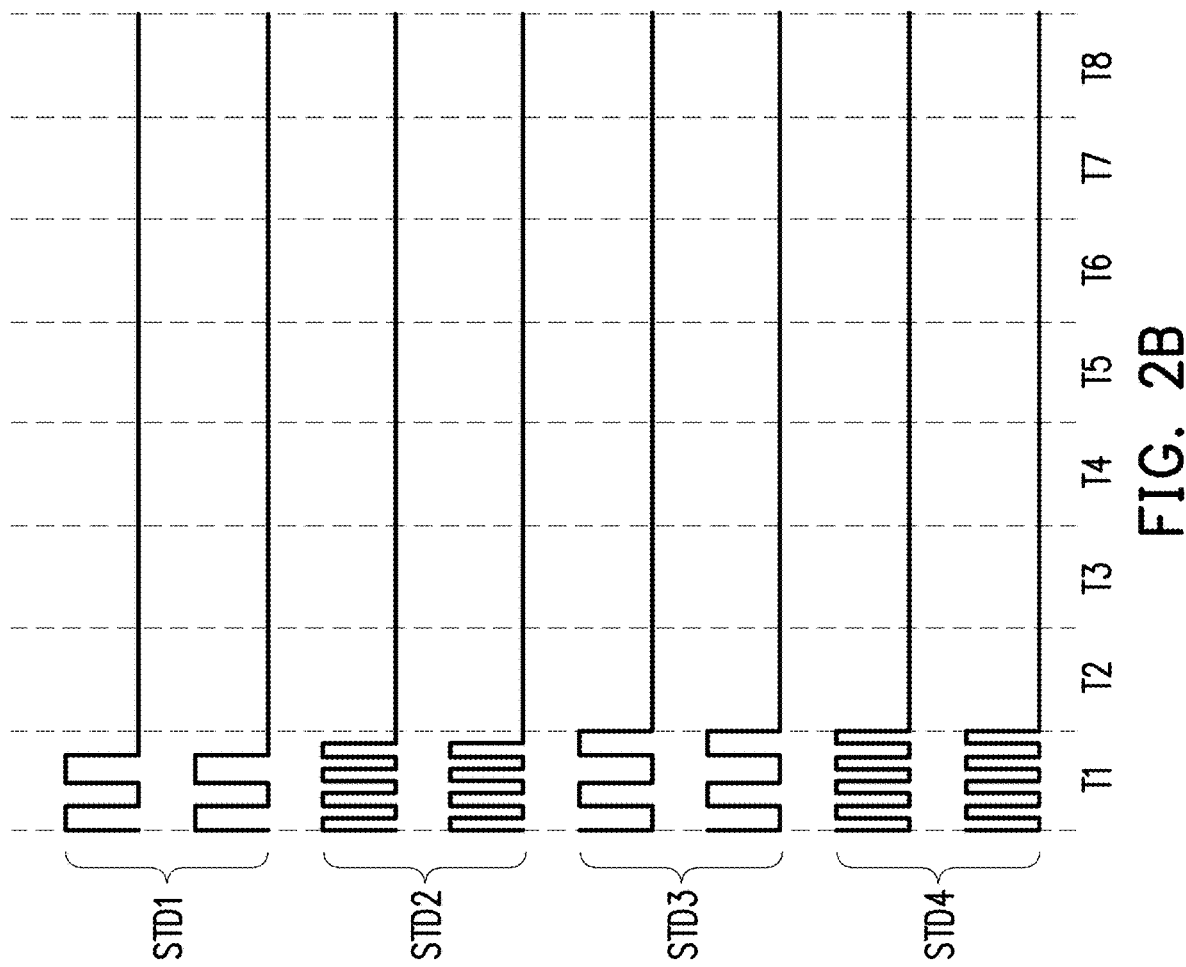
FIG. 2B is a waveform diagram illustrating the touch drive signals according to an embodiment of the disclosure.

Referring to FIG. 1, FIG. 2A, and FIG. 2B, FIG. 2A is a waveform diagram illustrating the touch drive signals for comparison. FIG. 2B is a waveform diagram illustrating the touch drive signals according to an embodiment of the disclosure. In FIG. 2A, during the time intervals T1 to T4 in the power saving mode, the touch drive signals STS1' to STS4' are provided to the touch area TCR1 and the touch area TCR2. During the time intervals T5 to T8, the touch drive signals STS5' to STS8' are provided to the touch area TCR3 and the touch area TCR4. The frequencies of the touch drive signals STS1' to STS8' are the same. The waveforms of the touch drive signals STS1' to STS8' may be different. In FIG. 2B, the touch drive signals STS1 to STS4 for the touch areas TCR1 to TCR4 may be provided to the touch areas TCR1 to TCR4 during the time interval T1 of the power saving mode, and may not be provided during the time intervals T2 to T7 of the power saving mode. Therefore, the power consumption of the touch panel 100 in the power saving mode can be reduced, compared to FIG. 2A.

Figure 3:
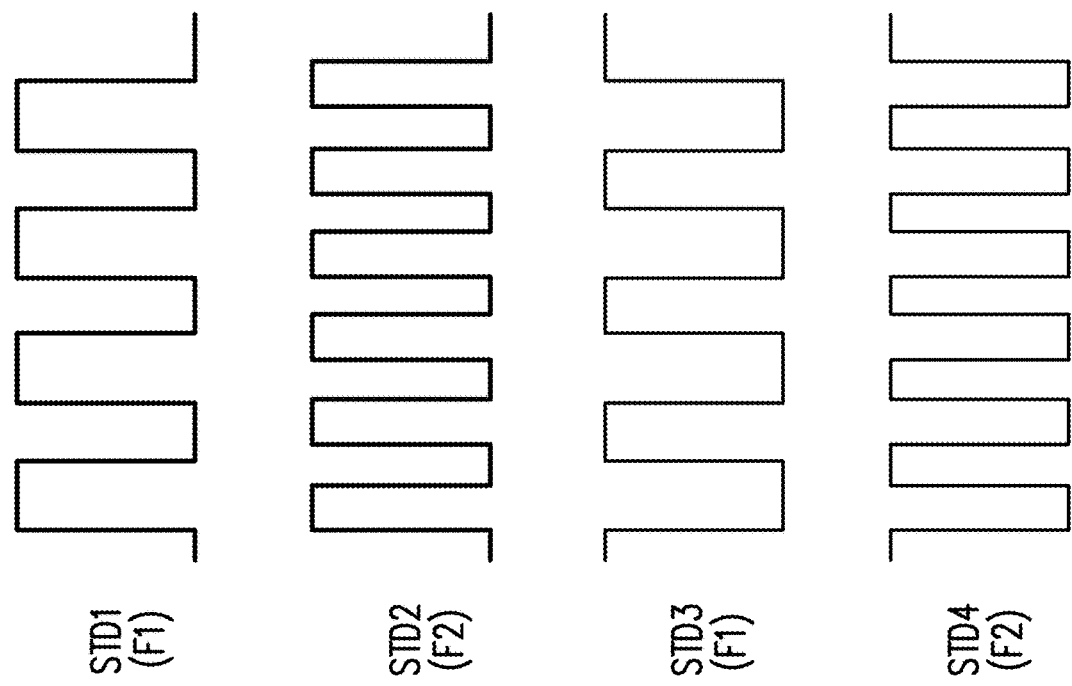
FIG. 3 is a waveform diagram illustrating the touch drive signals according to an embodiment of the disclosure.

Referring to FIG. 1 and FIG. 3, FIG. 3 is a waveform diagram illustrating the touch drive signals according to an embodiment of the disclosure. In this embodiment, the touch drive signal STD1 and the touch drive signal STD3 have the first frequency F1, and are inverted with respect to each other. As mentioned above, the sensing circuit 110 can determine whether the touch panel 100 is touched according to the capacitance value difference of the first touch area group and/or the capacitance value difference of the second touch area group. Therefore, in the first touch area group corresponding to the first frequency F1, when the touch area TCR1 is touched, the touch area TCR3 (that is, the inversion area of the touch area TCR1) may provide a reference capacitance value. On the other hand, when the touch area TCR3 is touched, the touch area TCR1 (that is, the inversion area of the touch area TCR3) may provide a reference capacitance value. In this way, the capacitance value difference of the first touch area group can be obtained. The capacitance value difference of the first touch area group is equal to the absolute value of the capacitance difference between the capacitance value of the touch area TCR1 and the capacitance value of the touch area TCR3 (that is, |Cmb1−Cmb3|).

Similarly, the touch drive signal STD2 and the touch drive signal STD4 have the second frequency F2, and are inverted with respect to each other. Therefore, in the second touch area group corresponding to the second frequency F2, when the touch area TCR2 is touched, the touch area TCR4 (that is, the inversion area of the touch area TCR2) may provide a reference capacitance value. On the other hand, when the touch area TCR4 is touched, the touch area TCR2 (that is, the inversion area of the touch area TCR4) may provide a reference capacitance value. In this way, the capacitance value difference of the second touch area group can be obtained. The capacitance value difference of the second touch area group is equal to the absolute value of the capacitance difference between the capacitance value of the touch area TCR2 and the capacitance value of the touch area TCR4 (that is, |Cmb2−Cmb4|).

In this embodiment, the second frequency F2 is higher than the first frequency F1. In some embodiments, the second frequency F2 may be lower than the first frequency F1.

Figure 4:
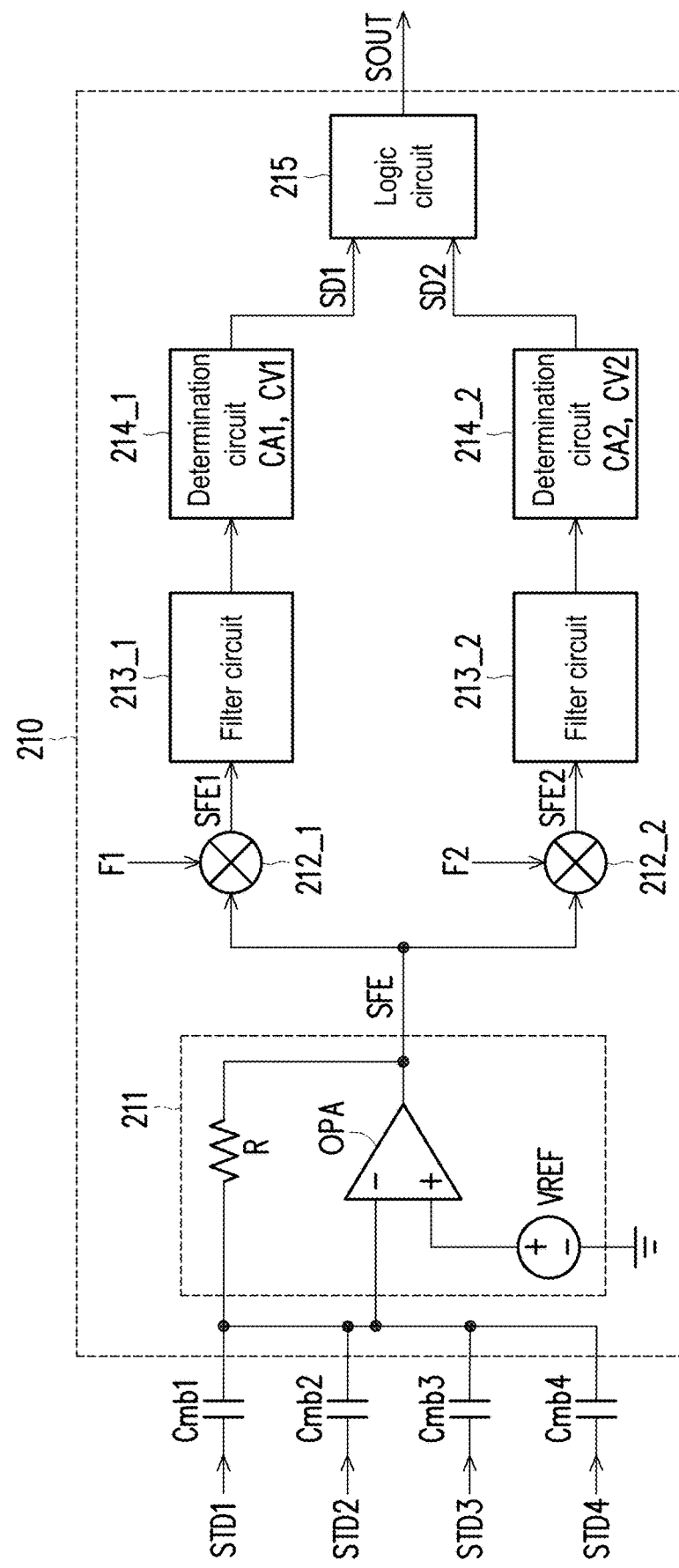
FIG. 4 is a schematic diagram illustrating the sensing circuit according to an embodiment of the disclosure.

Referring to FIG. 1 and FIG. 4, FIG. 4 is a schematic diagram illustrating the sensing circuit according to an embodiment of the disclosure. In this embodiment, the sensing circuit 210 includes a front-end circuit 211, demodulation circuits 212_1 and 212_2, filter circuits 213_1 and 213_2, determination circuits 214_1 and 214_2, and a logic circuit 215. The front-end circuit 211 generates the front-end signal SFE according to at least one of the touch sensing signals STS1 to STSn.

In this embodiment, the touch sensing signals STS1 to STSn received by the front-end circuit 211 are respectively correlated to the capacitance value Cmb1 of the touch area TCR1, the capacitance value Cmb2 of the touch area TCR2, the capacitance value Cmb3 of the touch area TCR3, and the capacitance value Cmb4 of the touch area TCR4. For example, when the touch area TCR2 is touched, the capacitance value Cmb2 is changed. Consequently, the touch sensing signals STS1 to STSn are changed. The waveform of the front-end signal SFE is also changed. In this embodiment, the front-end signal SFE is an analog modulated signal.

Furthermore, the front-end circuit 211 includes an operational amplifier OPA and a resistor R. An inverting input terminal of the operational amplifier OPA receives at least one of the touch sensing signals STS1 to STSn. A non-inverting input terminal of the operational amplifier OPA receives a reference voltage VREF. An output terminal of the operational amplifier OPA is configured to output the front-end signal SFE. The resistor R is coupled between the inverting input terminal of the operational amplifier OPA and the output terminal of the operational amplifier OPA. In this embodiment, the front-end circuit 211 is implemented by a subtractor. Therefore, at the first frequency F1, the front-end signal SFE is correlated to the capacitance value difference of the first touch area group (that is, |Cmb1−Cmb3|). At the second frequency F2, the front-end signal SFE is correlated to the capacitance value difference of the second touch area group (that is, |Cmb2−Cmb4|).

In this embodiment, the demodulation circuit 212_1 is coupled to the front-end circuit 211. The demodulation circuit 212_1 demodulates the front-end signal SFE into a first front-end signal SFE1 based on the first frequency F1. The first front-end signal SFE1 corresponds to the touch result of the touch area TCR1 and the touch area TCR3. In other words, the first front-end signal SFE1 is correlated to the capacitance value difference of the first touch area group (that is, |Cmb1−Cmb3|). The demodulation circuit 212_2 is coupled to the front-end circuit 211. The demodulation circuit 212_2 demodulates the front-end signal SFE into a second front-end signal SFE2 based on the second frequency F2. The second front-end signal SFE2 corresponds to the touch result of the touch area TCR2 and the touch area TCR4. In other words, the second front-end signal SFE2 is correlated to the capacitance value difference of the second touch area group (that is, |Cmb2−Cmb4|).

In this embodiment, the filter circuit 213_1 is coupled to the demodulation circuit 212_1. The filter circuit 213_1 receives the first front-end signal SFE1 and filters out noise at frequencies other than the first frequency F1 from the first front-end signal SFE1. The filter circuit 213_2 is coupled to the demodulation circuit 212_2. The filter circuit 213_2 receives the second front-end signal SFE2 and filters out noise at frequencies other than the second frequency F2 from the second front-end signal SFE2.

In this embodiment, the determination circuit 214_1 receives the first front-end signal SFE1 and provides a first determination signal SD1 according to the comparison result between the first front-end signal SFE1 and a first capacitance threshold CV1. The determination circuit 214_2 receives the second front-end signal SFE2 and provides a second determination signal SD2 according to the comparison result between the second front-end signal SFE2 and a second capacitance threshold CV2.

The logic circuit 215 is coupled to the determination circuit 214_1 and the determination circuit 214_2. The logic circuit 215 performs a logic operation on the first determination signal SD1 and the second determination signal SD2 to generate the output signal SOUT. The sensing circuit 210 determines whether the touch panel 100 is touched according to the output signal SOUT.

In this embodiment, after the demodulation operation based on the first frequency F1, the first front-end signal SFE1 is correlated to the absolute value CA1 of the first capacitance difference between the capacitance value Cmb1 of the touch area TCR1 and the capacitance value Cmb3 of the touch area TCR3 (that is, CA1=|Cmb1−Cmb3|). After the demodulation operation based on the second frequency F2, the second front-end signal SFE2 is correlated to the absolute value CA2 of the second capacitance difference between the capacitance value Cmb2 of the touch area TCR2 and the capacitance value Cmb4 of the touch area TCR4 (that is, CA2=|Cmb2−Cmb4|). When the absolute value CA1 of the first capacitance difference is greater than the first capacitance threshold CV1 or the absolute value CA2 of the second capacitance difference is greater than the second capacitance threshold CV2, the sensing circuit 210 determines that the touch panel 100 is touched.

In this embodiment, when the absolute value CA1 of the first capacitance difference is greater than the first capacitance threshold CV1, the determination circuit 214_1 provides the first determination signal SD1 with a first logic value. When the absolute value CA1 of the first capacitance difference is less than or equal to the first capacitance threshold CV1, the determination circuit 214_1 provides the first determination signal SD1 with a second logic value. The first logic value may be, for example, a high logic value. The second logic value may be, for example, a low logic value. When the absolute value CA2 of the second capacitance difference is greater than the second capacitance threshold CV2, the determination circuit 214_2 provides the second determination signal SD2 with the first logic value. When the absolute value CA2 of the second capacitance difference is less than or equal to the second capacitance threshold CV2, the determination circuit 214_2 provides the second determination signal SD2 with the second logic value. Therefore, the logic circuit 215 performs an OR logic operation on the first determination signal SD1 and the second determination signal SD2 to generate the output signal SOUT. The sensing circuit 210 determines that the touch panel 100 is touched in the power saving mode according to the first logic value of the output signal SOUT. The sensing circuit 210 determines that the touch panel 100 is not touched in the power saving mode according to the second logic value of the output signal SOUT. In this embodiment, the logic circuit 215 may be implemented by an OR gate, but the disclosure is not limited thereto.

In some embodiments, the first logic value may be, for example, a low logic value. The second logic value may be, for example, a high logic value. Therefore, the logic circuit 215 may be implemented by a NAND gate. The sensing circuit 210 determines that the touch panel 100 is touched in the power saving mode according to the first logic value of the output signal SOUT. The sensing circuit 210 determines that the touch panel 100 is not touched in the power saving mode according to the second logic value of the output signal SOUT.

In some embodiments, based on design requirements, the filter circuit 213_1 and the filter circuit 213_2 may be omitted.

Figure 5:
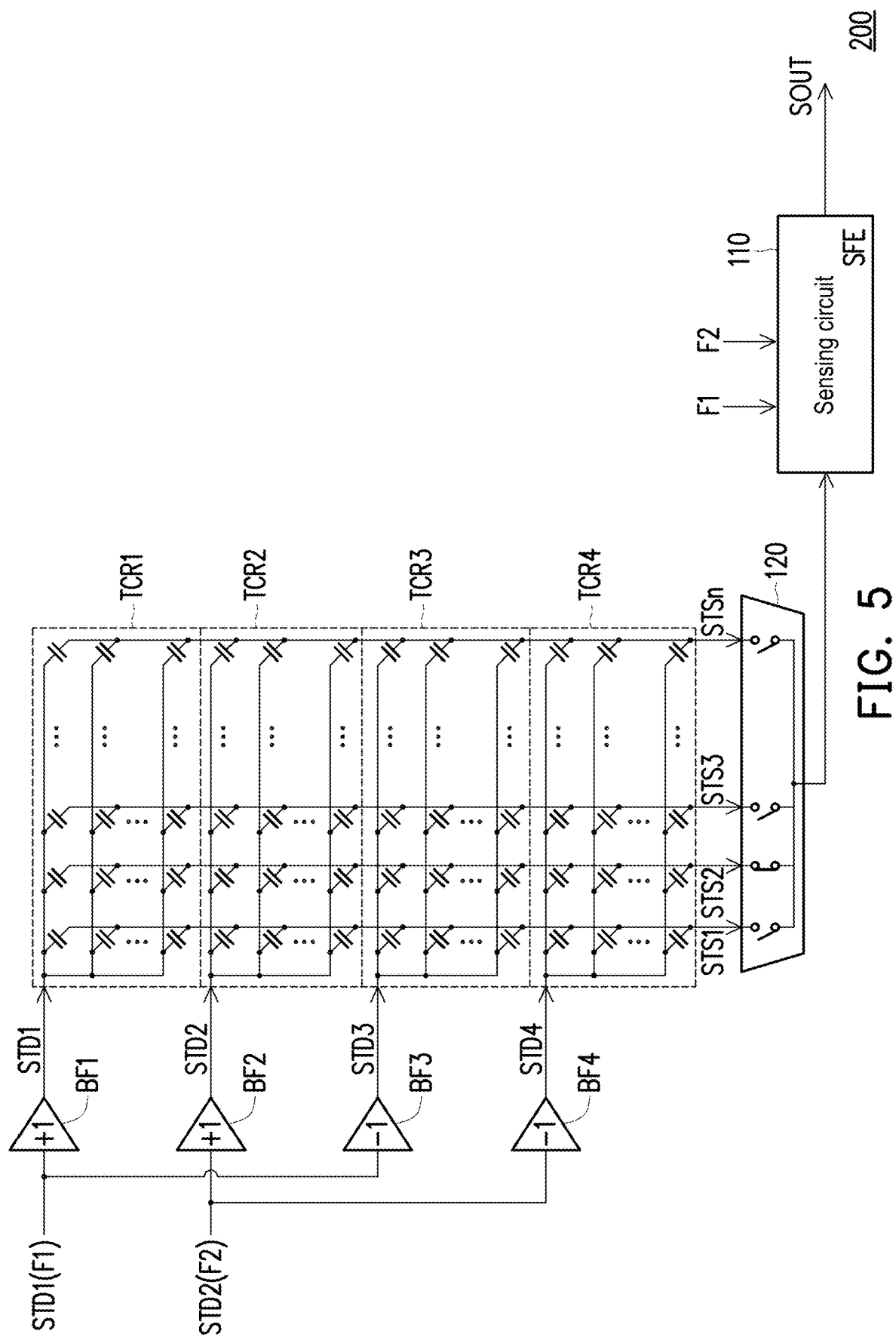
FIG. 5 is a schematic diagram illustrating the touch panel according to an embodiment of the disclosure.

Referring to FIG. 5, FIG. 5 is a schematic diagram illustrating the touch panel according to an embodiment of the disclosure. In this embodiment, a touch panel 200 includes touch areas TCR1 to TCR4, a sensing circuit 110, a selection circuit 120, and buffers BF1 to BF4. The operations of the touch areas TCR1 to TCR4, the sensing circuit 110, and the selection circuit 120 have been clearly described in the embodiments of FIG. 1 to FIG. 4, so the description will not be repeated here.

In this embodiment, input terminals of the buffer BF1 and the buffer BF3 receive the touch drive signal STD1 and the touch drive signal STD3 with the first frequency F1. An output terminal of the buffer BF1 is coupled to the touch area TCR1, and an output terminal of the buffer BF3 is coupled to the touch area TCR3. Input terminals of the buffer BF2 and the buffer BF4 receive the touch drive signal STD2 and the touch drive signal STD4 with the second frequency F2. An output terminal of the buffer BF2 is coupled to the touch area TCR2, and an output terminal of the buffer BF4 is coupled to the touch area TCR4. The touch drive signal STD1 and the touch drive signal STD3 are inverted with respect to each other. The touch drive signal STD2 and the touch drive signal STD4 are inverted with respect to each other. Therefore, the buffer BF1 and the buffer BF2 are implemented by followers or unity-gain buffers, respectively. The buffer BF3 and the buffer BF4 are implemented by inverters, respectively.

Figure 6:
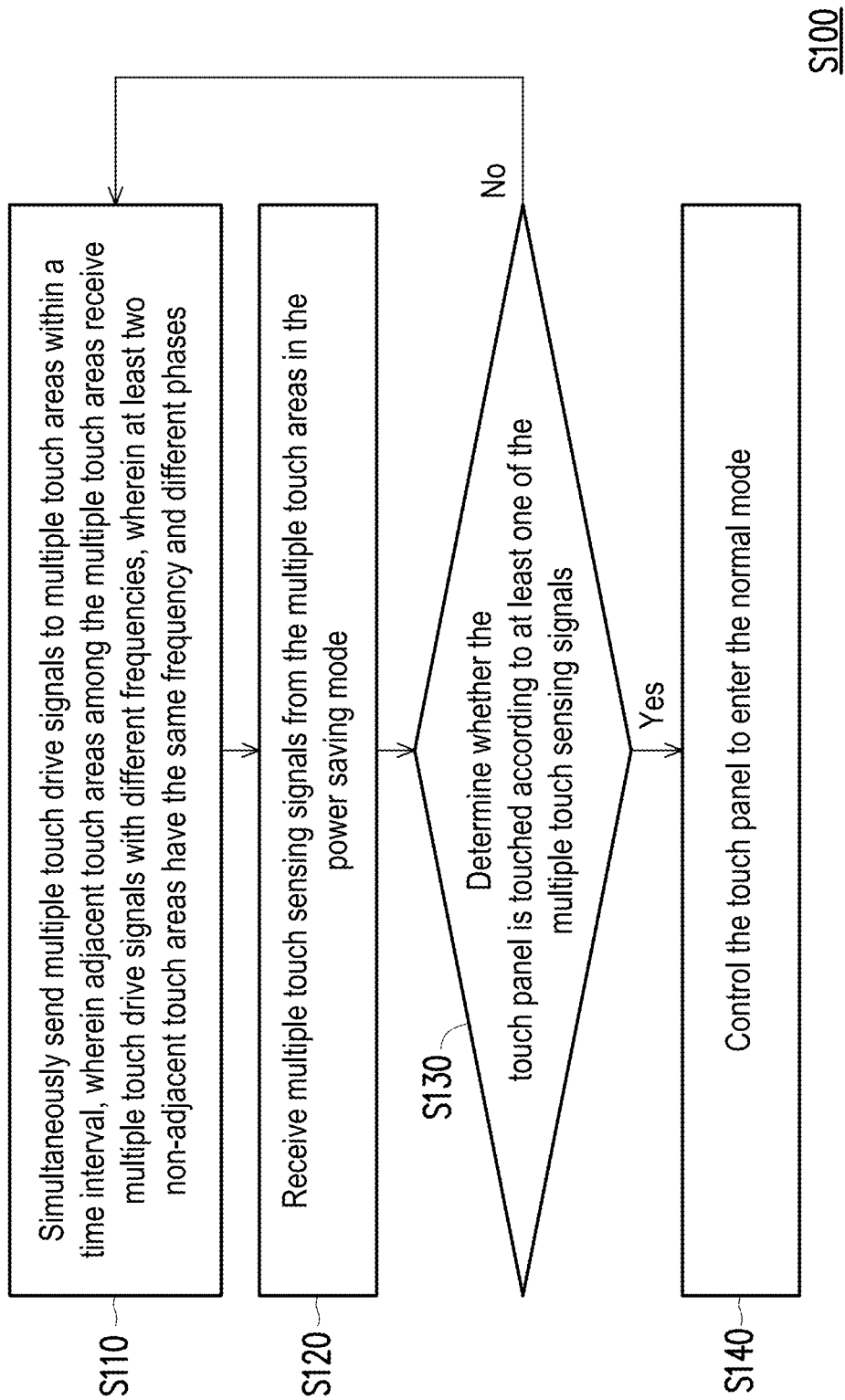
FIG. 6 is a flowchart illustrating the operating method according to an embodiment of the disclosure.

Referring to FIG. 1 and FIG. 6, FIG. 6 is a flowchart illustrating the operating method according to an embodiment of the disclosure. An operating method S100 is applicable to the touch panel 100. In this embodiment, the operating method S100 includes steps S110 to S140. In step S110, in the power saving mode, the touch panel 100 simultaneously sends the touch drive signals STD1 to STD4 to multiple touch areas TCR1 to TCR4 within a time interval. Adjacent touch areas among the touch areas TCR1 to TCR4 receive the touch drive signals with different frequencies. At least two non-adjacent touch areas among the touch areas TCR1 to TCR4 have the same frequency and different phases.

In step S120, the sensing circuit 110 receives the touch sensing signals STS1 to STSn from the touch areas TCR1 to TCR4 in the power saving mode. In step S130, the sensing circuit 110 determines whether the touch panel 100 is touched according to at least one of the touch sensing signals STS1 to STSn. In response to the touch panel 100 being touched, the sensing circuit 110 controls the touch panel 100 to enter the normal mode from the power saving mode in step S140. In response to the touch panel 100 being not touched, the operating method S100 returns to step S110. In this embodiment, the details of implementation of step S110 to step S140 have been clearly described in the embodiments of FIG. 1 to FIG. 4, so the description will not be repeated here.

Furthermore, the operating method S100 is also applicable to the touch panel 200 as shown in FIG. 5.

In summary, the touch panel includes a first touch area, a second touch area, a third touch area, and a fourth touch area. The third touch area and the first touch area are separated by the second touch area. The fourth touch area and the second touch area are separated by the third touch area. The second frequency is different from the first frequency. Therefore, in the case where multiple touch drive signals are provided to the corresponding touch areas, the touch sensing signals of adjacent touch areas do not interfere with each other. Thus, the calculation time for touch determination in the power saving mode of the touch panel can be shortened. Moreover, the power consumption of the touch panel in the power saving mode can be reduced.

Although the disclosure has been described with reference to the above embodiments, they are not intended to limit the disclosure. Those skilled in the art may make modifications and changes without departing from the spirit and scope of the disclosure. Therefore, the scope of protection of the disclosure shall be defined by the appended claims.

What is claimed is:
1. A touch panel, comprising:
a plurality of touch areas, wherein in a power saving mode, adjacent touch areas among the plurality of touch areas receive a plurality of touch drive signals with different frequencies, wherein at least two non-adjacent touch areas have the same frequency and different phases, and the touch panel simultaneously sends the plurality of touch drive signals to the plurality of touch areas within a time interval,
wherein the plurality of touch areas comprise:
a first touch area receiving a first touch drive signal with a first frequency;
a second touch area receiving a second touch drive signal with a second frequency;
a third touch area receiving a third touch drive signal with the first frequency; and
a fourth touch area receiving a fourth touch drive signal with the second frequency,
wherein the second frequency is different from the first frequency, and
wherein the first touch area and the third touch area are a first touch area group corresponding to the first frequency, and the second touch area and the fourth touch area are a second touch area group corresponding to the second frequency; and a sensing circuit coupled to the plurality of touch areas and configured to receive a plurality of touch sensing signals from the plurality of touch areas in the power saving mode, determine whether the touch panel is touched according to at least one of the plurality of touch sensing signals, and control the touch panel to enter a normal mode in response to the touch panel being touched, wherein the sensing circuit determines whether the touch panel is touched according to a capacitance value difference of the first touch area group and a capacitance value difference of the second touch area group.

2. The touch panel according to claim 1, wherein:
the first touch drive signal and the third touch drive signal are inverted with respect to each other, and
the second touch drive signal and the fourth touch drive signal are inverted with respect to each other.

3. The touch panel according to claim 1, wherein the sensing circuit comprises:
a front-end circuit configured to generate a front-end signal according to at least one of the plurality of touch sensing signals;
a first demodulation circuit coupled to the front-end circuit and configured to demodulate the front-end signal into a first front-end signal based on the first frequency; and
a second demodulation circuit coupled to the front-end circuit and configured to demodulate the front-end signal into a second front-end signal based on the second frequency,
wherein the first front-end signal corresponds to a touch result of the first touch area and the third touch area, and
wherein the second front-end signal corresponds to a touch result of the second touch area and the fourth touch area.

4. The touch panel according to claim 3, wherein:
the first front-end signal is correlated to an absolute value of a first capacitance difference between a capacitance value of the first touch area and a capacitance value of the third touch area,
the second front-end signal is correlated to an absolute value of a second capacitance difference between a capacitance value of the second touch area and a capacitance value of the fourth touch area, and
in response to the absolute value of the first capacitance difference being greater than a first capacitance threshold or the absolute value of the second capacitance difference being greater than a second capacitance threshold, the sensing circuit determines that the touch panel is touched.

5. The touch panel according to claim 4, wherein the sensing circuit further comprises:
a first determination circuit configured to receive the first front-end signal and provide a first determination signal according to a comparison result between the first front-end signal and the first capacitance threshold;
a second determination circuit configured to receive the second front-end signal and provide a second determination signal according to a comparison result between the second front-end signal and the second capacitance threshold; and
a logic circuit coupled to the first determination circuit and the second determination circuit and configured to perform a logic operation on the first determination signal and the second determination signal to generate an output signal,
wherein the sensing circuit determines whether the touch panel is touched according to the output signal.

6. An operating method for a touch panel, the operating method comprising:
in a power saving mode, simultaneously sending a plurality of touch drive signals from the touch panel to a plurality of touch areas within a time interval, wherein adjacent touch areas among the plurality of touch areas receive the plurality of touch drive signals with different frequencies, wherein at least two non-adjacent touch areas have the same frequency and different phases,
wherein the plurality of touch areas comprise:
a first touch area receiving a first touch drive signal with a first frequency;
a second touch area receiving a second touch drive signal with a second frequency;
a third touch area receiving a third touch drive signal with the first frequency; and
a fourth touch area receiving a fourth touch drive signal with the second frequency,
wherein the second frequency is different from the first frequency, and
wherein the first touch area and the third touch area are a first touch area group corresponding to the first frequency, and the second touch area and the fourth touch area are a second touch area group corresponding to the second frequency;
in the power saving mode, receiving a plurality of touch sensing signals from the plurality of touch areas, and determining whether the touch panel is touched according to at least one of the plurality of touch sensing signals; and
controlling the touch panel to enter a normal mode in response to the touch panel being touched, wherein determining whether the touch panel is touched according to a capacitance value difference of the first touch area group and a capacitance value difference of the second touch area group.

7. The operating method according to claim 6, wherein:
the first touch drive signal and the third touch drive signal are inverted with respect to each other, and
the second touch drive signal and the fourth touch drive signal are inverted with respect to each other.

8. The operating method according to claim 6, wherein determining whether the touch panel is touched according to at least one of the plurality of touch sensing signals comprises:
generating a front-end signal according to at least one of the plurality of touch sensing signals;
demodulating the front-end signal into a first front-end signal based on the first frequency; and
demodulating the front-end signal into a second front-end signal based on the second frequency,
wherein the first front-end signal corresponds to a touch result of the first touch area and the third touch area, and
wherein the second front-end signal corresponds to a touch result of the second touch area and the fourth touch area.

9. The operating method according to claim 8, wherein:
a waveform of the first front-end signal is correlated to an absolute value of a first capacitance difference between a capacitance value of the first touch area and a capacitance value of the third touch area, and
a waveform of the second front-end signal is correlated to an absolute value of a second capacitance difference between a capacitance value of the second touch area and a capacitance value of the fourth touch area.

10. The operating method according to claim 9, wherein determining whether the touch panel is touched according to at least one of the plurality of touch sensing signals further comprises:
   determining that the touch panel is touched in response to the absolute value of the first capacitance difference being greater than a first capacitance threshold or the absolute value of the second capacitance difference being greater than a second capacitance threshold.

11. The operating method according to claim 10, wherein determining that the touch panel is touched in response to the absolute value of the first capacitance difference being greater than the first capacitance threshold or the absolute value of the second capacitance difference being greater than the second capacitance threshold comprises:
   providing a first determination signal according to a comparison result between the first front-end signal and the first capacitance threshold;
   providing a second determination signal according to a comparison result between the second front-end signal and the second capacitance threshold;
   performing a logic operation on the first determination signal and the second determination signal to generate a logic output signal; and
   determining whether the touch panel is touched according to the logic output signal.

* * * * *